No. 789,464.   Patented May 9, 1905.

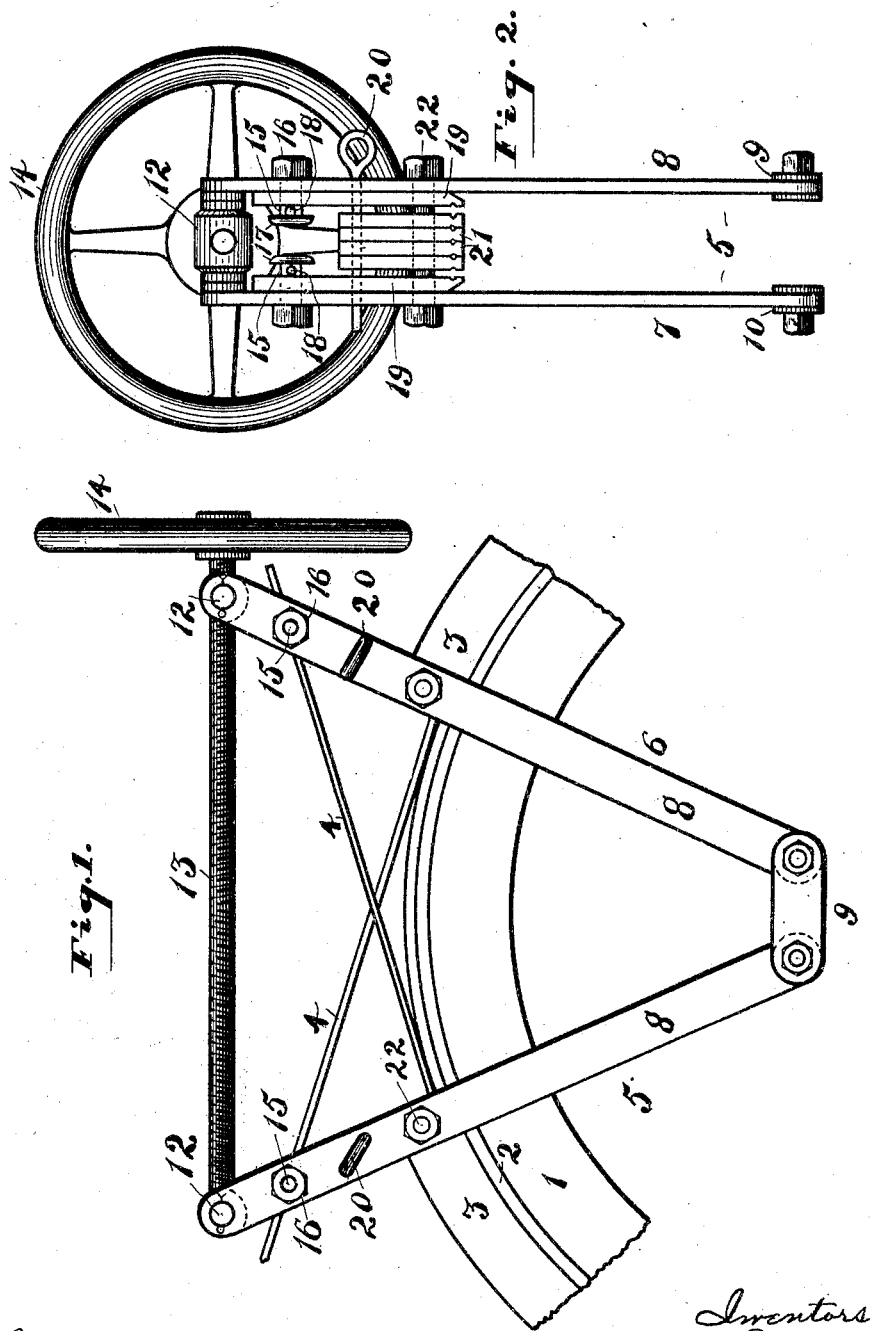

UNITED STATES PATENT OFFICE.

EDWARD B. TRAGLER AND WILLIAM R. HARRIS, OF AKRON, OHIO; SAID HARRIS ASSIGNOR TO SAID TRAGLER.

RUBBER-TIRE-SETTING MACHINE.

SPECIFICATION forming part of Letters Patent No. 789,464, dated May 9, 1905.

Application filed October 8, 1904. Serial No. 227,716.

*To all whom it may concern:*

Be it known that we, EDWARD B. TRAGLER and WILLIAM R. HARRIS, citizens of the United States, residing at Akron, in the county of Summit and State of Ohio, have invented a certain new and useful Improvement in Rubber-Tire-Setting Machines, of which the following is a complete specification.

Our invention relates to machines for setting cushioned tires having a metallic core or cores on the rim of the vehicle-wheels; and the objects thereof are to produce a light, simple, and inexpensive device of the character named which, if desired, can be utilized in placing rubber tires upon wheels without the necessity of placing the wheels in a frame or rack or centering them upon shafts, but, on the contrary, can be lifted readily by hand and placed upon the vehicle-wheel while reposing upon the ground and still be perfectly effective in operation, and to make said device capable of operating on wheels of different sizes, and provide means by which the cores can be tightened to any desired tension and by which they can be held in suitable position to allow a workman to readily operate while fitting and brazing the cores together, and also to keep the rubber portion of said tires out of the way while said operations are being carried on.

Another object is to provide improved clamps for gripping the core-wires to be used in connection with this device.

In accomplishing these objects we employ certain novel and peculiar mechanism, one form of which is hereinafter described, reference being had to the accompanying drawings, forming a part hereof.

In the accompanying drawings, in which similar reference-numerals indicate like parts in the different figures, Figure 1 is a side elevation of a rubber-tire-setting machine embodying our invention, showing the parts of the same in the position assumed when the core-wires are crossed between the ends of the tire and engaged by the clamps on the drawing-arms and while drawing and tightening the core-wires to compress the tire on and around the rim of the wheel before uniting the ends of the cores between the ends of the rubber tire; and Fig. 2 is an end view looking from the left of Fig. 1.

In the drawings, 1 is the felly of an ordinary vehicle-wheel, which may be supported or suspended in any preferred or desired manner, the mode of doing so being immaterial to this invention. Mounted upon the felly 1 is a metallic flanged rim 2, on which is to be seated a rubber tire 3, the separated ends of which only are shown in the drawings, and in this rubber tire are embedded core-wires 4.

The mechanism which we employ to simultaneously impart a tension to the wires 4 and force back the rubber tire 3 from the point where it is intended to join the wires 4 consists of two members 5 and 6, made up of parallel arms 7 and 8, separated so as to straddle the vehicle-wheel and arranged to stand approximately radial to the wheel center. The arms 8 are pivotally united to a link 9, thus allowing them to rock toward and away from each other, and the arms 7 are similarly united by a link 10, and these links 9 and 10 are substantially parallel at all times. Extending between the upper ends of the arms 7 and 8 of both of the members 5 and 6 are pivotally-mounted nuts 12, through the centers of which are screw-threaded openings, the threads in the opening in one nut being opposite in inclination with respect to the threads in the opening in the other nut. Through these two openings are placed a right and left handed threaded shaft 13, operated by a hand-wheel 14 at one end thereof.

The clamps used in exerting the initial tension on the binding or core wires consists of bolts 15, passing through the upper portions of the arms 7 and 8 of both of the members 5 and 6, these bolts having on their outer ends nuts 16, by which they are drawn up, and having on their inner sides large flat heads 17. Adjacent to these large flat heads 17 these bolts are transversely perforated by openings 18, through which the core-wires are inserted. These bolts 17 also pass through the upper ends of members 19 of an auxiliary clamp, which is located below them and will be later described. It will be obvious that by inserting the ends of the core-wires 4 through the openings 18 and the subsequent manipulation of the nuts 16 the core-wires will be effectually compressed and held between the heads 17 of the bolts 15 and the upper ends of the members 19 of the other clamp of the device.

Immediately below the bolts 15 are pins 20, generally provided with looped heads for convenience in handling and which pass through both arms 7 and 8 of each element 5 and 6. These pins 20 also pass through the members 19. Suspended on the pins 20 are a plurality of relatively thin plates 21, through whose lower ends are cut a series of semicircular notches for the purposes of gripping the sides of the core-wires when they are tightly compressed or drawn toward one another. These plates 21 in unison with the members 19 are caused to grip the core-wires by means of bolts 22, passing through both arms 7 and 8 of the members 5 and 6. It will be apparent that by having a plurality of plates, each of which constitutes by itself one member of a wire-gripping device, various sizes of tires may be seated in their channels with perfect ease by this machine without altering the make-up of the wire-gripping jaws to suit each individual case from the fact that the wires may be led through between any of the plates 21 or between the outside plates and members 19.

The operation of this device is as follows: A tire with embedded wires placed therein of correct length to be wrapped about the vehicle-wheel is placed in the channel of this rim. The wheel meanwhile may be on a vehicle or held by a vise attached to a convenient post or by any suitable means. The machine is then taken and lifted by hand and placed over the point where it is intended to join the rubber tire. The ends of the wires are passed through the openings 18 in the bolts 16 and firmly secured therein, while the members 5 and 6 are approximately close together. In doing this the members 19 and plates 21 will be separated as far as is necessary to enable the wires to pass between them at whatever point it will be found convenient. The right and left handed threaded shaft 13 is then operated by means of the hand-wheel 14 throwing apart the upper ends of the members 5 and 6. This action of the threaded shaft 13 causes the wires to be drawn taut, and at the same time the rubber tires abutting against the outer faces of the auxiliary clamp, made up of the plates 21 and members 19, will force back the rubber to enable a wide enough opening to be made between their ends to enable an operator to properly braze and join the core-wires 4 together. After the wires have been drawn sufficiently taut the bolts 22 are tightened, thereby firmly gripping the wires at that point, the bolts 16 are released, the ends of the wires after being cut off at proper distances are brazed together, the bolts 22 are then released, and the device lifted from the wheel. The ends of the rubber tire are then worked together and are united by cement.

What we claim, and desire to secure by Letters Patent, is—

The combination in a device for setting rubber tires on vehicle-wheels, of a pair of members, arranged approximately radially with respect to the wheel, each of which members consists of two parallel arms, pivotal, threaded, perforated nuts uniting the outer ends of the arms of each member, links connecting the inner ends of the arms of different members, means to swing the outer ends of said members toward and away from each other, independent wire-clamps in the outer portions of each of said arms, an auxiliary wire-clamp located between the arms of each member and supported by means passing through said arms consisting of a plurality of separate plates similarly sustained, provided with grooves in their opposing faces to permit the placing between them of rubber-tire-retaining wires, and means to simultaneously clamp the component parts of each clamp on a plurality of said retaining-wires.

In testimony that we claim the above we hereunto set our hands in the presence of two subscribing witnesses.

EDWARD B. TRAGLER.
WILLIAM R. HARRIS.

In presence of—
C. E. HUMPHREY,
GLENARA FOX.